(12) United States Patent
Rajabali et al.

(10) Patent No.: US 7,700,174 B2
(45) Date of Patent: Apr. 20, 2010

(54) LAMINATE WITH FILL LAYER

(75) Inventors: Abdoel Faziel Rajabali, Alphen aan den Rijn (NL); Willem Jan Nicolaas Ter Steeg, Pulheim (DE)

(73) Assignee: Stork Fokker AESP B.V., Papendrecht (NL)

( * ) Notice: Subject to any disclaimer, the term of this patent is extended or adjusted under 35 U.S.C. 154(b) by 0 days.

(21) Appl. No.: 10/563,553

(22) PCT Filed: Jul. 7, 2004

(86) PCT No.: PCT/NL2004/000486

§ 371 (c)(1),
(2), (4) Date: Mar. 14, 2006

(87) PCT Pub. No.: WO2005/002834

PCT Pub. Date: Jan. 13, 2005

(65) Prior Publication Data

US 2006/0159886 A1  Jul. 20, 2006

(30) Foreign Application Priority Data

Jul. 8, 2003  (NL) .................................. 1023854

(51) Int. Cl.
*B32B 3/00* (2006.01)
*B32B 5/00* (2006.01)
*B32B 7/00* (2006.01)
(52) U.S. Cl. .............................. 428/57; 428/53; 428/58; 428/60; 428/98; 428/189; 428/608
(58) Field of Classification Search ................... 428/57, 428/38, 189, 33, 60, 53, 58, 98, 608
See application file for complete search history.

(56) References Cited

U.S. PATENT DOCUMENTS 5,160,771 A * 11/1992 Lambing et al. .............. 428/57
5,866,272 A * 2/1999 Westre et al. ............... 428/593

FOREIGN PATENT DOCUMENTS

WO    WO 98/53989         12/1998
WO    WO 02/078950 A1 *  10/2002

* cited by examiner

*Primary Examiner*—Brent T O'Hern
(74) *Attorney, Agent, or Firm*—Young & Thompson

(57) ABSTRACT

A laminate has alternating metal layers and at least one plastic bonding layer. The metal layers each comprise at least two metal layer sections that have mutually overlapping edges bonded to one another. To even out the differences in thickness, a fill is provided which has at least a thickness such that at the location of the fill the laminate has a thickness equal to the thickness at the location of the overlapping edges.

12 Claims, 2 Drawing Sheets

LAMINATE WITH FILL LAYER

BACKGROUND OF THE INVENTION

The invention relates to a laminate of alternating metal layers and at least one plastic bonding layer, which metal layers each comprise two metal layer sections that have mutually overlapping edges bonded to one another.

Such laminates are known. The laminate concerned can be a laminate where the metal layers are bonded to one another by an adhesive layer, or a laminate where there are one or more fibre layers impregnated with an adhesive between the metal layers. As a consequence of the overlap of the metal layer sections, the laminate has an unevenness that in some cases can give rise to disadvantages. If the laminate is fixed to a structural component such as a frame, one of the metal layer sections must be joggled to ensure that both metal layer sections can be in direct contact with the frame. In the case of an aircraft's skin this means that the outside thereof also has a joggle, which can be undesirable for aerodynamic reasons.

SUMMARY OF THE INVENTION

The aim of the invention is, therefore, to provide a laminate of the type described above that does not have these disadvantages. Said aim is achieved in that a fill is provided which has a thickness at least such that at the location of the fill the laminate has a thickness equal to the thickness at the location of the overlapping edges.

In the case of the laminate according to the invention there is no joggle on either side, such that for assembly on, for example, a frame, the side facing away from the latter can remain completely flat. Preferably, the fill layer is directly alongside two mutually overlapping edges, such that both sides of the laminate have as uniform as possible a shape. In this context there can be a fill on either side of two mutually overlapping edges.

The edge of one of the mutually overlapping metal layer sections can be joggled such that the metal layer sections of a metal layer are essentially in the extension of one another. In this case the fills can also be in the extension of one another.

As already mentioned above, the laminate can advantageously be joined to a frame. In this case it is not necessary to provide the complete laminate with fills. Consequently, the laminate can comprise a part in which there is at least one fill as well as a part without fill.

The fill can be implemented in various ways. For instance, the fill can comprise at least one plastic bonding layer. Several metal layers and several plastic bonding layers can also be concerned here. The fill can also comprise a metal layer with a thickness greater than that of the other metal layers. However, the plastic bonding layer must then be correspondingly thinner. The plastic bonding layers can consist simply of an adhesive layer, or of fibre layers impregnated with adhesive.

BRIEF DESCRIPTION OF THE DRAWINGS

The invention will be explained in more detail below with reference to an illustrative embodiment shown in the figures.

DESCRIPTION OF THE PREFERRED EMBODIMENTS

Figure 1:
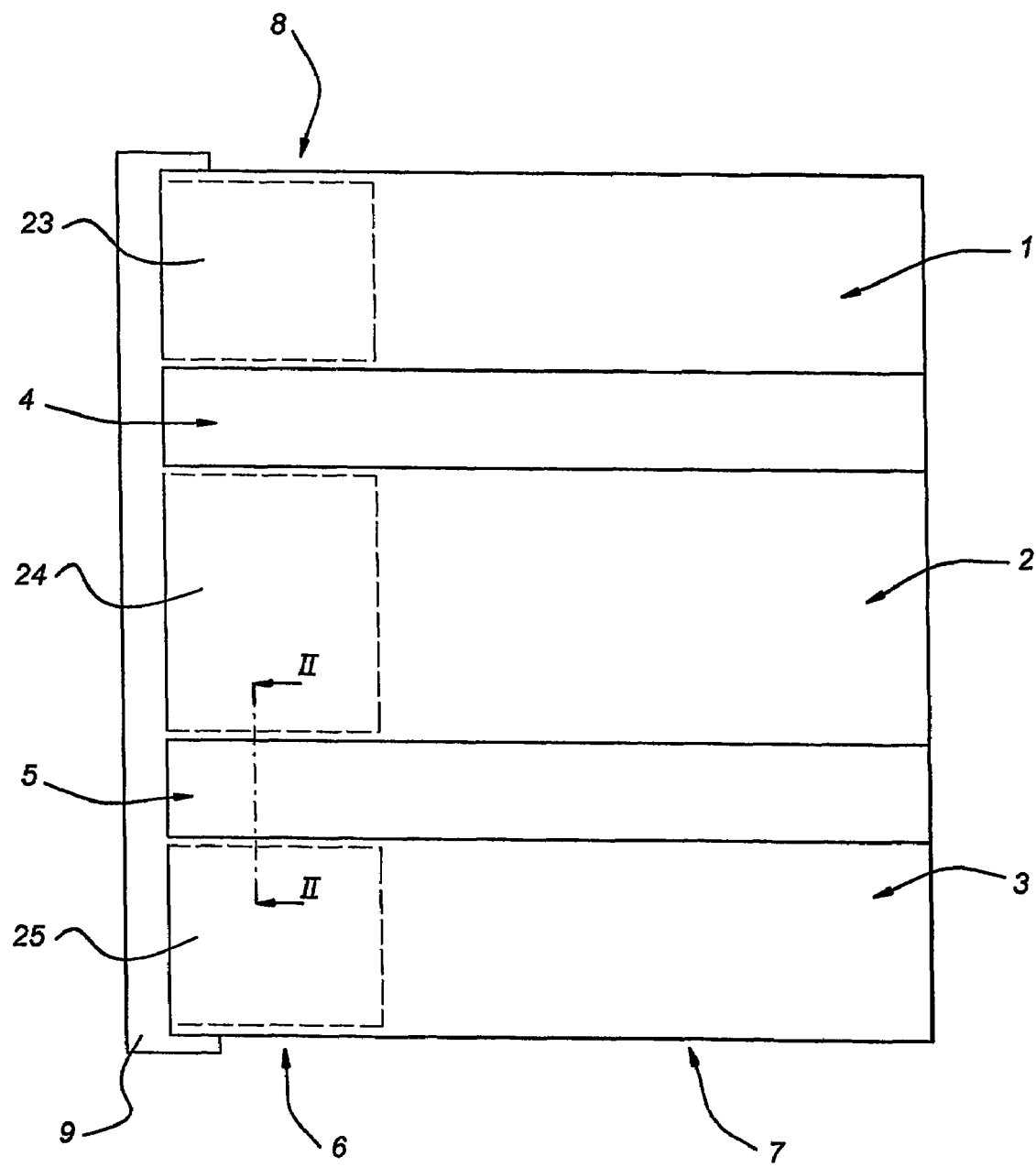
FIG. 1 shows a plan view of a laminate according to the invention.

The laminate shown in FIG. 1 comprises three laminate parts 1, 2, 3 that are fixed to one another by means of joins 4 and 5. Furthermore, it is possible to differentiate two regions in the laminate, i.e. a region 6 where there is a fill indicated in its entirety by 8 between the layers of the laminate and a region without fill, or to put it another way, the standard laminate 7. At the location of the region 6 the laminate can be fixed to another laminate by means of strip 9.

It is known that at the location of the joins 4, 5 the standard laminate has a somewhat greater thickness because the edges of the laminate overlap one another there. This means that at least one side of the laminate is not flat but is stepped to some extent. This is not desirable in some applications. In the case of an aircraft skin, for example, it is better if both sides of the laminate are completely flat. The frames 9 can then be attached to one side, the inside, while the other side nevertheless has aerodynamic properties because of the completely flat form thereof. Flatness of the surface of the laminate can also be desirable for other reasons. The fitting of underlying structural elements such as stiffeners, edge reinforcements for hatches or covers, corners of door openings and the like are mentioned as further examples.

According to the invention, the fill indicated in its entirety by 8 is therefore arranged in the region 6 at the location of the join to the frame 9. Said fill is not needed outside said region 6, that is to say in the region 7. The outside of the laminate is completely flat in that region, but it is not a problem if the inside of the laminate is stepped in this location. After all, a frame does not have to be attached to the laminate at that location.

Figure 2:
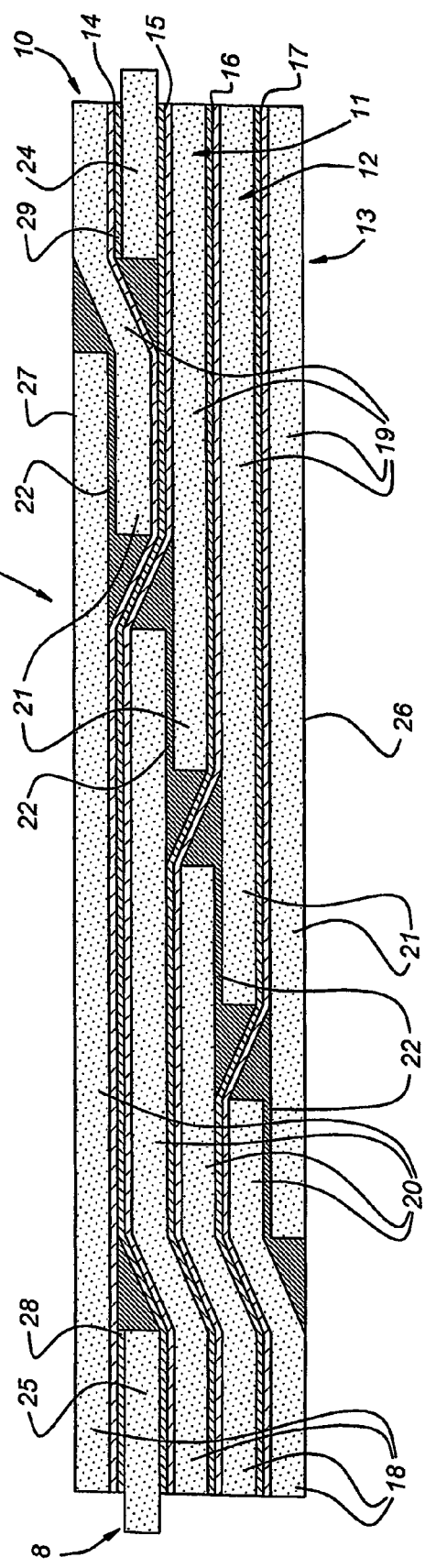
FIG. 2 shows the section according to II-II in FIG. 1.

As shown in FIG. 2, the joins 4, 5 are implemented in a known manner with overlapping edges of the metal layers 10, 11, 12 and 13. These metal layers are bonded to one another by means of fibre-reinforced bonding layers 14, 15, 16 and 17. However, the metal layers can also be bonded directly to one another by means of an adhesive, without fibre layers between them.

At the location of the joins 4, 5, each metal layer 10-13 forms two metal layer sections 18, 19, with respective overlapping edges (ends) 20 and 21, respectively. These overlapping edges are fixed to one another by means of an adhesive 22 for transferring stresses in the laminate by means of shear forces.

According to the invention, fills 8 in the form of metal layers 25, 24 in combination with plastic bonding layers 28, 29 are arranged on either side of the overlapping edges 20, 21 of the metal layer 10. As shown in FIG. 1, there are several fills, depending on the number of joins 4, 5. The fills have a thickness that is equal to the sum of the thickness of one of the metal layers 10-13 plus the thickness of one of the plastic bonding layers 14-17, such that on either side of the joins 4, 5 the thickness of the laminate is the same as that of the laminate at the location of the joins 4, 5. Both sides 26, 27 of the laminate are completely flat as a result.

By way of further explanation, and with reference to FIG. 2, the laminate may include at least four metal layers (10-13) and a respective plastic bonding layer (14-17) between each adjacent pair of the metal layers. Each of the metal layers may include a pair of metal layer sections (18-19), where each pair of metal layer sections has mutually overlapping ends (20-21) whose opposing surfaces are bonded to one another. In each pair, one of the mutually overlapping ends is displaced in a thickness direction of the laminate (i.e., transverse to the metal layers) to overlap the other of the mutually overlapping ends in the respective pair so that, except for the displaced one of the ends, the pair of metal layer sections are extensions of one another. Further, the mutually overlapping ends of each pair of metal layer sections do not overlap the mutually overlapping ends of any other pair of metal layer sections such that at the location of the mutually overlapping ends the laminate has a uniform thickness (i.e., the laminate has a uniform thickness in the region of the four overlapping ends in FIG. 2).

The laminate also includes a fill (24, 25) that may be at least one further metal layer, where the fill is spaced from and does not overlap any of the mutually overlapping ends and has a thickness such that at the location of the fill the laminate has a thickness equal to the uniform thickness of the laminate at said mutually overlapping ends (i.e., as shown in FIG. 2, the laminate has the same uniform thickness in the region of the four overlapping ends and in the region of the fill at the right and left ends of FIG. 2.) That is, the fill may be spaced laterally (left-right in FIG. 2) from the mutually overlapping ends so as to avoid overlapping the mutually overlapping ends.

The invention claimed is:

1. Laminate comprising:
   alternating metal layers and at least one plastic bonding layer,
   each of said metal layers comprising two metal layer sections, said two metal layer sections having mutually overlapping ends whose opposing surfaces are bonded to one another, one of said mutually overlapping ends being displaced in a thickness direction of the laminate to overlap the other of said mutually overlapping ends so that, except for the displaced one of the ends, said two metal layer sections are extensions of one another, and
   a fill that comprises at least one further metal layer, said fill being spaced from and not overlapping the mutually overlapping ends and having a thickness such that at the location of the fill the laminate has a thickness equal to a thickness of the laminate at the mutually overlapping ends.

2. Laminate according to claim 1, wherein the fill is on at least one side of two of the mutually overlapping ends.

3. Laminate according to claim 1, wherein the fill is on both sides of two of the mutually overlapping ends.

4. Laminate according to claim 1, wherein the fill further comprises at least one further plastic bonding layer.

5. Laminate according to claim 1, wherein the further metal layer has a thickness greater than that of said metal layers.

6. Laminate according to claim 1, wherein the plastic bonding layer comprises a layer of adhesive.

7. Laminate according to claim 1, wherein the plastic bonding layer comprises a fibre layer that has been impregnated with an adhesive.

8. Laminate according to claim 1, wherein the fill is interlaminar.

9. Laminate according to claim 1, wherein the further metal layer has a thickness the same as that of said metal layers.

10. Laminate comprising:
    alternating metal layers (10-13) and at least one plastic bonding layer (14-17), each of said metal layers comprising two metal layer sections (18-19),
    wherein in a join region (4, 5) of said laminate said two metal layer sections have mutually overlapping ends (20-21) whose opposing surfaces are bonded to one another, one of said mutually overlapping ends being displaced in a thickness direction of the laminate to overlap the other of said mutually overlapping ends, and
    wherein in a fill region (6) of said laminate a fill (8), comprising a further metal layer, is provided between two of said metal layers and spaced laterally from the mutually overlapping ends so as to avoid overlapping the mutually overlapping ends, said fill having a thickness such that in the fill region the laminate has a thickness equal to a thickness of the laminate in the join region.

11. Laminate according to claim 10, wherein the further metal layer has a thickness the same as that of said metal layers.

12. A laminate comprising:
    at least four metal layers and a respective plastic bonding layer between each adjacent pair of said metal layers,
    wherein each of said metal layers comprises a pair of metal layer sections, each said pair of metal layer sections having mutually overlapping ends whose opposing surfaces are bonded to one another,
    wherein, in each said pair, one of said mutually overlapping ends is displaced in a thickness direction of the laminate to overlap the other of said mutually overlapping ends in the respective said pair so that, except for the displaced one of the ends, said pair of metal layer sections are extensions of one another,
    wherein said mutually overlapping ends of each said pair of metal layer sections do not overlap said mutually overlapping ends of any other said pair of metal layer sections such that at the location of said mutually overlapping ends the laminate has a uniform thickness; and
    a fill that comprises at least one further metal layer, said fill being spaced from and not overlapping any of said mutually overlapping ends and having a thickness such that at the location of the fill the laminate has a thickness equal to the uniform thickness of the laminate at said mutually overlapping ends.

* * * * *